United States Patent
Jiang et al.

(10) Patent No.: US 10,558,792 B2
(45) Date of Patent: Feb. 11, 2020

(54) TOUCH-SCREEN USER KEY-PRESS BEHAVIOR PATTERN CONSTRUCTION AND ANALYSIS SYSTEM AND IDENTITY RECOGNITION METHOD THEREOF

(71) Applicant: TONGJI UNIVERSITY, Shanghai (CN)

(72) Inventors: Changjun Jiang, Shanghai (CN); Chungang Yan, Shanghai (CN); Hongzhong Chen, Shanghai (CN); Zhijun Ding, Shanghai (CN); Hongbo Zhang, Shanghai (CN)

(*) Notice: Subject to any disclaimer, the term of this patent is extended or adjusted under 35 U.S.C. 154(b) by 85 days.

(21) Appl. No.: 15/770,736

(22) PCT Filed: Jan. 15, 2016

(86) PCT No.: PCT/CN2016/070991
§ 371 (c)(1),
(2) Date: Apr. 24, 2018

(87) PCT Pub. No.: WO2017/071126
PCT Pub. Date: May 4, 2017

(65) Prior Publication Data
US 2019/0073457 A1    Mar. 7, 2019

(30) Foreign Application Priority Data
Oct. 28, 2015  (CN) .......................... 2015 1 0713975

(51) Int. Cl.
*H04L 29/00* (2006.01)
*G06F 21/31* (2013.01)
(Continued)

(52) U.S. Cl.
CPC .......... *G06F 21/316* (2013.01); *G06F 3/0412* (2013.01); *G06F 3/0416* (2013.01); *G06F 3/04886* (2013.01); *H04W 12/06* (2013.01)

(58) Field of Classification Search
CPC .... G06F 21/316; G06F 3/0416; G06F 3/0412; G06F 3/04886; G06F 21/31;
(Continued)

(56) References Cited

U.S. PATENT DOCUMENTS

2008/0209229 A1* 8/2008 Ramakrishnan ........ G06F 21/32
713/186
2012/0191993 A1* 7/2012 Drader .................. G06F 1/3215
713/320
(Continued)

FOREIGN PATENT DOCUMENTS

CN          102831435 A       12/2012
CN          104318136 A       1/2015
(Continued)

OTHER PUBLICATIONS

Saevanee et al., "Authenticating User Using Keystroke Dynamics and Finger Pressure", 6th IEEE Consumer Communications and Networking Conference, Date of Conference: Jan. 10-13 (Year: 2009).*

*Primary Examiner* — Morshed Mehedi
(74) *Attorney, Agent, or Firm* — Global IP Services; Tianhua Gu

(57) ABSTRACT

A construction and analysis system of touch screen user keypress behavior pattern, and an identity recognition method thereof. Data analysis is performed by using historical keypress information of inputting a password by using a soft keyboard, a corresponding neural network model is established and model calculation is performed to new to-be-detected data to recognize a user identity; the system consists of a user data acquisition module, a data preprocessing module, a model training module and a user identity authentication module; the user data acquisition module is responsible for acquiring time sequence information, pressure and contact area information; the data prepro-
(Continued)

cessing module is responsible for acquiring data, removing dirty data and normalizing to the data; the model training module is responsible for analysing input patterns and establishing models; and the user identity authentication module is for performing model calculation to new to-be-detected data to recognize user identities and improve the security of user account passwords.

4 Claims, 4 Drawing Sheets

(51) Int. Cl.
*G06F 3/0488* (2013.01)
*H04W 12/06* (2009.01)
*G06F 3/041* (2006.01)

(58) Field of Classification Search
CPC .... H04W 12/06; H04L 63/1425; H04L 63/00; H04L 63/083
See application file for complete search history.

(56) References Cited

U.S. PATENT DOCUMENTS

2014/0104218 A1* 4/2014 Drader ............... G06F 1/3215
345/173
2015/0106310 A1* 4/2015 Birdwell ............. G06F 16/22
706/20

FOREIGN PATENT DOCUMENTS

CN 104318138 A 1/2015
EP 2479642 A1 7/2012

* cited by examiner

US 10,558,792 B2

TOUCH-SCREEN USER KEY-PRESS BEHAVIOR PATTERN CONSTRUCTION AND ANALYSIS SYSTEM AND IDENTITY RECOGNITION METHOD THEREOF

CROSS REFERENCE TO RELATED PATENT APPLICATION

The present application is the US national stage of PCT/CN2016/070991 filed on Jan. 15, 2016, which claims the priority of the Chinese patent application No. CN2015107139753 filed on Oct. 28, 2015, which application is incorporated herein by reference.

BACKGROUND OF THE PRESENT INVENTION

Field of Invention

The present invention relates to electronic commerce identity authentication, in particular to a construction and analysis system of touch screen user key press behavior pattern, and an identity recognition method thereof.

Description of Related Arts

The impact of computer networks to human life and economy is incomparable with the impact of other information carriers. Its high-speed development and all-around infiltration accelerate the informatization process of the entire society. Therein, electronic commerce is one important application of the Internet technology, which is becoming a global economic subject and develops very fast. In the increasingly growing electronic commerce market, quite a number of users start to turn to mobile commerce.

However, with the development of various electronic commerce websites, more and more potential hazards involving the security of electronic transactions emerge, and behaviors of illegal users who pretend to be illegal users to steal information and account funds cause extremely great troubles to electronic commerce websites and users. Traditional electronic commerce websites authenticate user identities by using usernames and passwords to guarantee identity legality of users in use. However, such method is based on an assumption that only legal users know their usernames and passwords. Once account information is embezzled, the traditional method cannot effectively guarantee the security of user accounts. How to effectively recognize the real identities of users has already been a problem which is greatly concerned by people in development of electronic commerce on mobile terminals.

SUMMARY OF THE PRESENT INVENTION

In view of the above-mentioned disadvantages in the prior art, the purpose of the present invention is to provide a touch screen user keypress behavior pattern construction and analysis system and an identity recognition method thereof, which are used for solving the problem that the existing authentication method and means cannot effectively guarantee the security of user accounts.

Oriented at the situation that usernames and passwords of mobile terminal users are stolen by lawbreakers, in combination with use habits of mobile terminal touch screen users, the present invention puts forward the concept of mobile terminal touch screen user keyboard behavior pattern. Since what are used by most mobile terminal users at current are smart phones with touch screens, passwords are input by fingers by clicking virtual keyboards on screens and this behavior has a similarity to a keyboard behavior of PC terminal users. Characteristics of users in clicking screens to input passwords are associated with ages, habitually used hands, genders, familiarity with mobile phones and the like, and keyboard behavior patterns of different users are difficult to be imitated and embezzled by others. By acquiring time characteristic and pressure characteristic data that mobile terminal users click virtual keyboards of touch screens, establishing user unique keyboard behavior models by using RBF neural networks and matching user keyboard behaviors to be authenticated with the models, the present invention achieves the purpose of authenticating user identities.

The technical solution provided by the present invention is as follow:

An construction and analysis of identity recognition method based on touch screen user keypress behavior pattern refers to that data analysis is performed by using historical keypress information of inputting passwords by using soft keyboards on mobile phone touch screens according to account login of users within a period of time, corresponding neural network models are established and model calculation is performed to new to-be-detected data to recognize user identities. The method comprise following steps:

step 1: user data acquisition acquiring corresponding behavior characteristic information according to a keypress behavior process that mobile terminal users input passwords through soft keyboards of mobile phones, wherein the behavior characteristic information comprises time sequence information, pressure information and contact area information that the users click the soft keyboards and input the passwords; and preferably, at a user data acquisition stage, key-in data in one recent month are recorded and acquired as training data of users, and relevant data acquisition information is sent at a back-stage to a remote server;

step 2: data preprocessing being responsible for processing time data, substracting a down-press timestamp from an upspring timestamp in each input sequence obtain keypress duration $t_h$; substracting upspring time in a previous input sequence from down-press time in each input sequence to obtain keypress interval $t_i$; and denoting pressure data as p and contact area data as a;

processing or removing data which are called and acquired by a system and do not comply with rules, wherein, for each user, the password length is fixed, a number of data items of each recorded data entry is given and data entries with data items which are not matched with given length are removed;

data with keypress duration $t_h$ and keypress interval $t_i$ which are greater than 3000 ms, pressure P which is greater than 1.5 and contact area a which is greater than 1 are considered as wrong data caused by sensor errors, and the data are removed; and since the acquired data are different in dimension, in order to facilitate the processing performed by a model training module, normalization processing needs to be performed to the data; and here normalization processing is respectively performed to all recorded $t_h$, $t_i$, p and a; and for raw data X, X is transformed to X* through maximum and minimum normalization according to a transformation formula $$X^* = \frac{X - \min}{X - \max},$$

where max is a maximum value of samples in all users and min is a minimum value of samples in all users;

step 3: user behavior training performing classification to users by using RBF (Radial Basis Function) neural networks as models, time information and pressure information of user input behaviors are respectively establishing modeled since sensitivity of mobile phone sensors of users is different, so as to reduce errors caused by difference of mobile devices; denoting T $(t_{h1}, t_{h2}, \ldots, t_{hn}, t_{i1}, t_{i2}, \ldots, t_{in-1})$ of one user input as a time characteristic vector, and denoting P $(p_1, p_2, \ldots, p_n, a_1, a_2, \ldots, a_n)$ as a pressure characteristic vector, where n is user password length; and respectively performing training to T and P by using two independent RBF neural networks, denoted as $N_T$ and $N_P$, where an input of the $N_T$ is T and a target output is a unique recognition vector which is allocated to each user in advance; m users which participate in identity judgment are supposed to be $u_1, u_2, \ldots, u_m$, an expected output vector corresponding to each user in a process of training the RBF neural network is $O_{ui}=(X_1, X_2, \ldots, X_m)$, which expresses an output of the neural network under an ideal situation, where $$X_j = \begin{cases} 0, & i \neq j \\ x, & i = j \end{cases};$$

and an output of the $N_P$ is P and a target output is the same as the $N_T$; the neural network is trained by adopting a self-organized basis function center selection method; after the two neural networks are trained by adopting the method, an average error of each neural network is calculated and the average errors of the two neural networks are respectively denoted as $E_T$ and $E_P$; and an output weight is set for each neural network and the output weights are respectively denoted as $W_T$ and $W_P$, where $$W_T = \frac{E_P}{E_T + E_P}, W_P = \frac{E_T}{E_T + E_P};$$

and step 4: user identity authentication for an new input sequence to which identity authentication of a certain user needs to be performed, firstly performing preprocessing and normalization to the new input sequence according to step 2, decomposing the data into the time characteristic vector T and the pressure characteristic vector P according to the methods in step 3, respectively inputting the vectors into the neural networks $N_T$ and $N_P$, and respectively denoting output vectors of $N_T$ and $N_P$ as $O_T$ and $O_P$; defining a final output vector O as:

$$O = W_T \cdot O_T + W_P \cdot O_P$$

comparing an Euclidean distance between O and a recognition vector of the user with a preset threshold, if the distance is smaller than a preset threshold, the user is a legal user, accepting a login request, adding the sequence into a model database and updating the model database; and otherwise, the user is an illegal user, refusing the login request at a current time and giving a warning.

The present invention further discloses a construction and analysis system of touch screen user keypress behavior pattern, comprising a user data acquisition module, a data preprocessing module, a model training module and a user identity authentication module.

The data acquisition module operates as an APP in the system and a soft keyboard is provided as an input interaction interface. This module is responsible for acquiring time sequence information, pressure and contact area information that user click soft keyboards and input passwords, and storing raw data into a database; the data preprocessing module is responsible for performing preprocessing to the acquired data, removing dirty data and performing normalization to the data; the model training module is responsible for performing analysis to key-in patterns of all users and establishing models; and the user identity authentication module is responsible for performing model calculation to new to-be-detected data to recognize user identities.

Preferably, the data acquisition module acquires time, pressure and contact area data that the users key the passwords in by using MotionEvent function of Android system.

Preferably, the data preprocessing module and the user identity authentication module are both connected with mobile terminal users through wireless communication.

As described above, by acquiring time characteristic and pressure characteristic data that mobile terminal users click virtual keyboards of touch screens, establishing user unique keyboard behavior models by using RBF neural networks and matching user keyboard behaviors to be authenticated with the models, the present invention achieves the purpose of authenticating user identities and solves the security problem caused by username and password leakage to a certain extent.

The present invention has the following innovations and beneficial effects:

1. The implementation process of the present invention is convenient and feasible, no special hardware support is needed and an improvement is only needed on the basis of traditional authentication; and identity authentication is performed by using information about that mobile terminal users input passwords on mobile phone touch screens and no additional operation is needed for users.

2. Identity (behavior) authentication and password authentication are synchronously performed and the security of the traditional authentication system is improved.

3. The method can guarantee a lower detection miss rate on the premise of a higher user identity authentication pass rate.

4. Models are respectively established for time characteristic data and pressure characteristic data of user inputs such that errors caused by a reason that the sensitivity of sensors of mobile devices is different are reduced.

DETAILED DESCRIPTION OF THE PREFERRED EMBODIMENTS

The implementation modes of the present invention will be described below through specific embodiments. One skilled in the art can easily understand other advantages and effects of the present invention according to contents disclosed by the description. The present invention can also be implemented or applied through other different specific implementation modes. Various modifications or changes may also be made to all details in the description based on different points of view and applications without departing from the spirit of the present invention.

Please refer to FIGS. 1-4. It needs to be stated that the drawings provided in the following embodiments are just used for schematically describing the basic concept of the present invention, thus only illustrate components only related to the present invention and are not drawn according to the numbers, shapes and sizes of components during actual implementation, the configuration, number and scale of each component during actual implementation thereof may be freely changed, and the component layout configuration thereof may be more complex.

Figure 1:
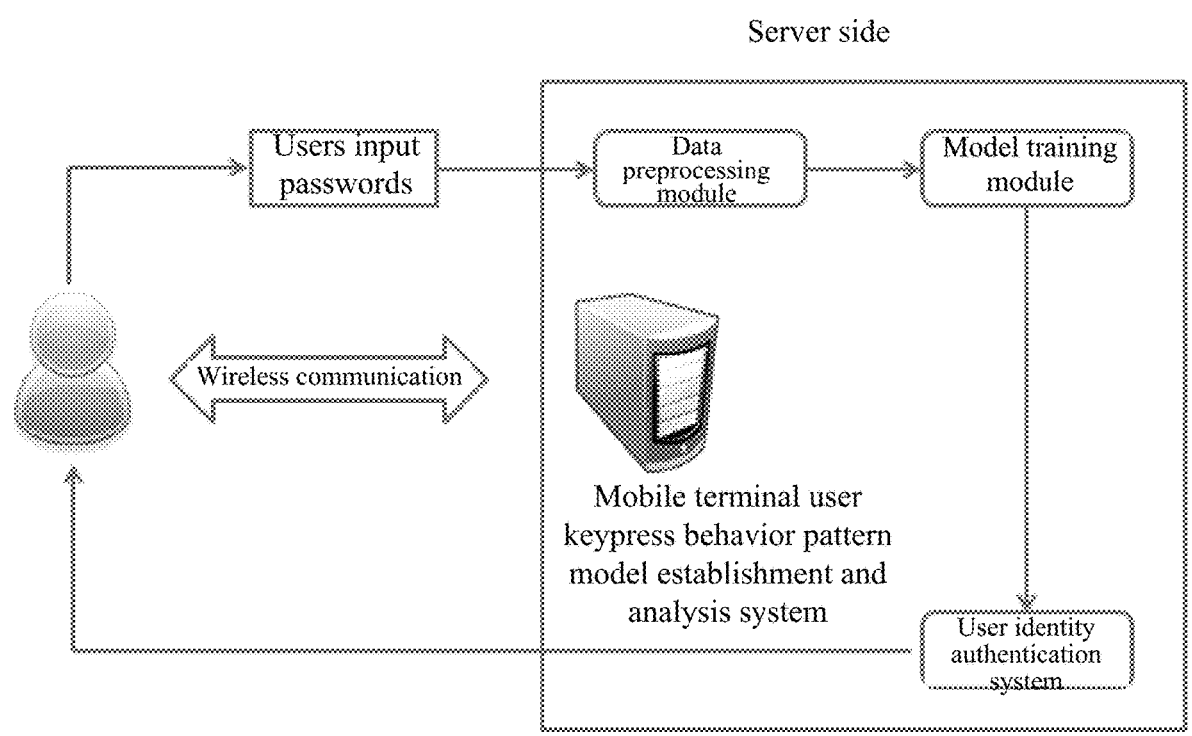
FIG. 1 illustrates a schematic diagram of construction and analysis system of touch screen user keypress behavior pattern according to the present invention.

As illustrated, FIG. 1 illustrates a schematic diagram of construction and analysis system of touch screen user keypress behavior pattern according to the present invention, the schematic diagram of construction and analysis system of touch screen user keypress behavior pattern comprises a user data acquisition module (not shown), a data preprocessing module, a model training module and a user identity authentication module.

Figure 2:
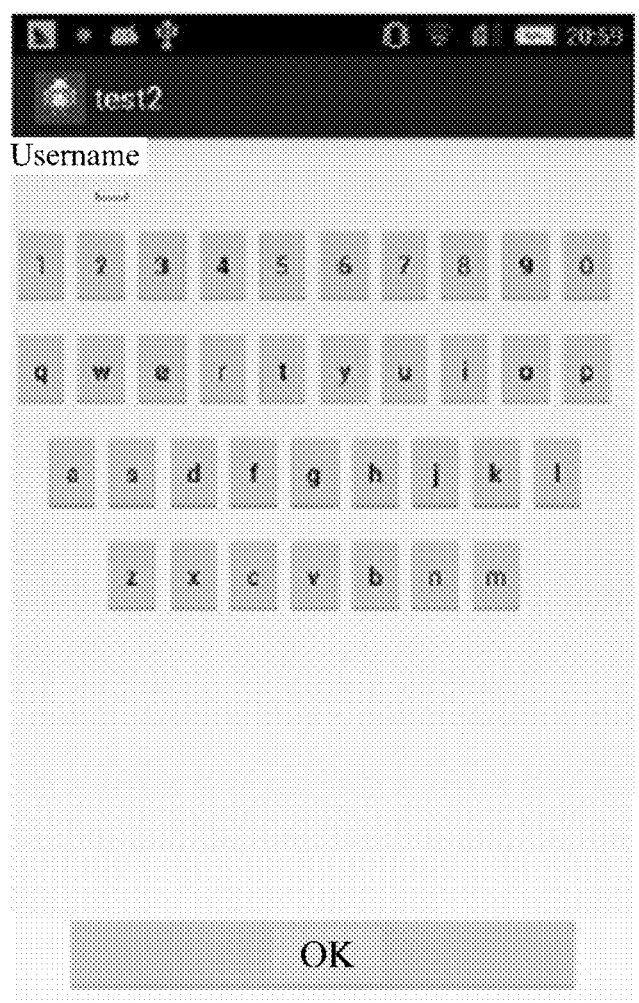
FIG. 2 illustrates an interface screenshot of a data acquisition module according to the present invention.

The data acquisition module operates as an APP in the system and a soft keyboard is provided as an input interaction interface, as illustrated, FIG. 2 illustrates an interface screenshot of a data acquisition module, this module acquires time, pressure and contact area data when user inputs password by MotionEvent function of Android system, and raw data are stored in a server-side database. A format of data acquired by this module is as shown in Table 1:

TABLE 1 example of Acquired data

| Input sequence | Down-press time | Upspring time | Pressure | Contact area |
|---|---|---|---|---|
| 1 | 24021 | 24109 | 0.65 | 0.32 |
| 2 | 24316 | 24411 | 0.45 | 0.47 |

Wherein down-press and upspring time are system timestamps when actions are completed.

The data preprocessing module is responsible for performing preprocessing to the acquired data, removing dirty data and performing normalization to the data; the model training module is responsible for performing analysis to typing patterns of all users and establishing models; and the user identity authentication module is responsible for performing model calculation to new to-be-detected data to recognize user identities. The data preprocessing module and the user identity authentication module are both connected with mobile terminal users through wireless communication.

Specific steps of an identity recognition method of construction and analysis system of the touch screen user keypress behavior pattern are as follows:

step 1: the data acquisition module acquires user data.

Corresponding behavior characteristic information is acquired according to a keypress behavior process that mobile terminal users input passwords through soft keyboards of mobile phones, wherein the behavior characteristic information comprises time sequence information, pressure information and contact area information that the users click the soft keyboards and input the passwords; and at a user data acquisition stage, typing data in one recent month are recorded and acquired as training data of users, and relevant data acquisition information is sent at a backstage to a remote server.

step 2: the data preprocessing module performs preprocessing to relevant data.

Firstly, processing is performed to time data, substracting a down-press timestamp from an upspring timestamp in each input sequence will obtain keypress duration $t_h$; substracting upspring time in a previous input sequence from down-press time in each input sequence will obtain keypress interval $t_i$; and pressure data is indicated as p and contact area data is indicated as a.

Secondly, data which are called and acquired by a system and do not comply with rules are processed or removed; for each user, the password length is fixed, a number of data items of each recorded data entry is given, and data entries of which data items are not matched with given length are removed; and data with keypress duration $t_h$ and keypress interval $t_i$ greater than 3000 ms, pressure p greater than 1.5 and contact area a greater than 1 are considered as wrong data caused by sensor errors, and the data are removed.

Since the acquired data are different in dimension, in order to facilitate the processing performed by the model training module, the data further needs to be normalized; and here normalization processing is respectively performed to all recorded $t_h$, $t_i$, p and a; and raw data X is transformed to X* through maximum and minimum normalization according to a transformation formula $$X^* = \frac{X - \min}{X - \max},$$

where max is a maximum value of samples in all users and min is a minimum value of samples in all users.

step 3: the model training module performs user behavior training.

The users are classified by using RBF (Radial Basis Function) neural networks as models, time information and pressure information of user input behaviors are respectively modeled since sensitivities of mobile phone sensors of users are different, so as to reduce errors caused by difference of mobile devices; T ($t_{h1}$, $t_{h2}$, . . . , $t_{hn}$, $t_{i1}$, $t_{i2}$, . . . $t_{in-1}$) of one user input is denoted as a time characteristic vector, and P ($p_1$, $p_2$, . . . , $p_n$, $a_1$, $a_2$, . . . , $a_n$) is denoted as a pressure characteristic vector, wherein n is user password length; and training is respectively performed to T and P by using two independent RBF neural networks, denoted as $N_T$ and $N_P$.

An input of the $N_T$ is T, and a target output is a unique recognition vector which is allocated to each user in advance; m users which participate in identity judgment are supposed to be $u_1$, $u_2$, . . . , $u_m$, an expected output vector corresponding to each user in a process of training the RBF neural network is $O_{ui} = (X_1, X_2, \ldots, X_m)$, which indicate an output of the neural network under an ideal situation, where $$X_j = \begin{cases} 0, & i \neq j \\ x, & i = j \end{cases};$$

and an input of the $N_P$ is P and a target output is the same as $N_T$; the neural network is trained by adopting a self-organized basis function center selection method; after the two neural networks are trained by adopting the method, an average error of each neural network is calculated, and the average errors of the two neural networks are respectively denoted as $E_T$ and $E_P$; an output weight is set for each neural network and the output weights are respectively denoted as $W_T$ and $W_P$, wherein $$W_T = \frac{E_P}{E_T + E_P}, W_P = \frac{E_T}{E_T + E_P}.$$

step 4: the user identity authentication module perform user identity authentication.

Figure 3:
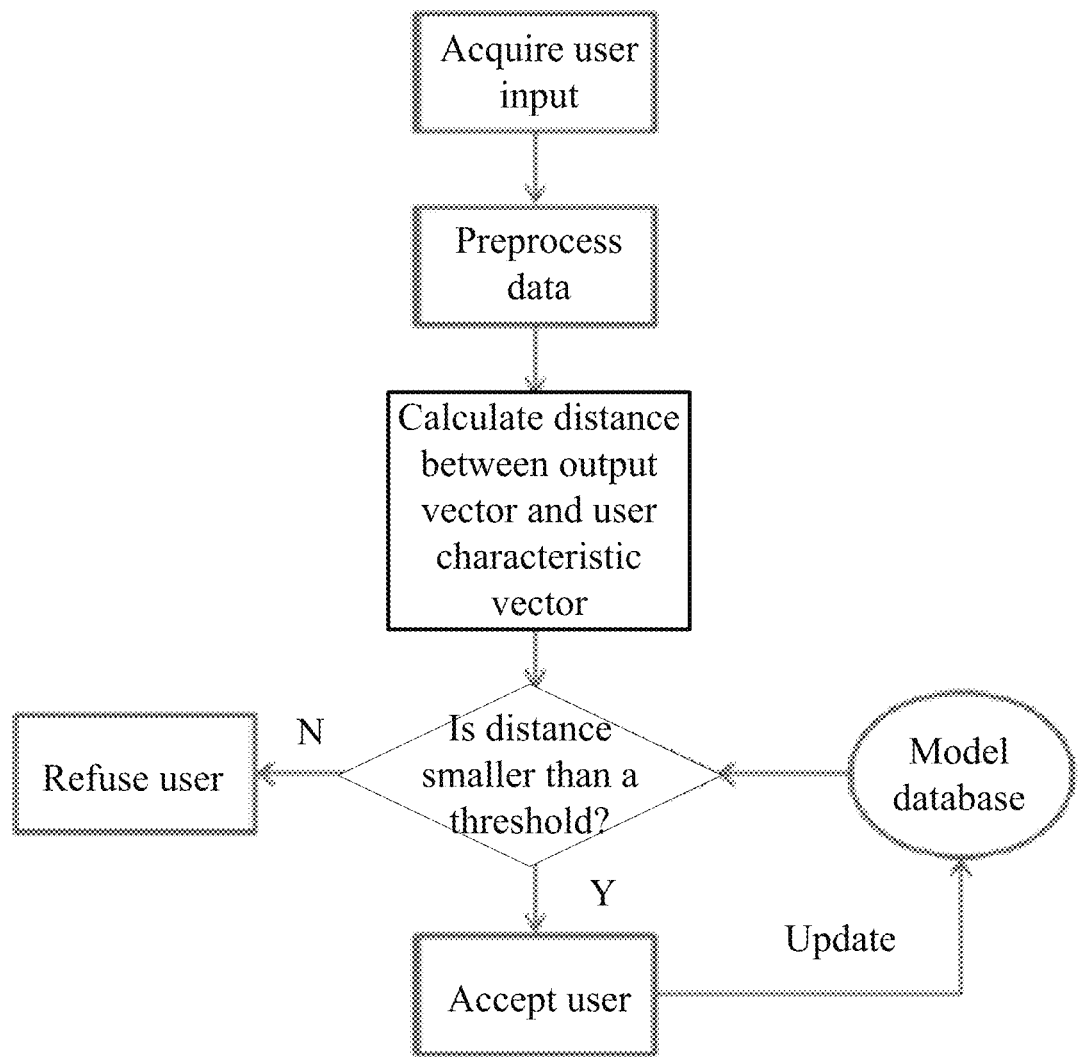
FIG. 3 illustrates a flowchart of user identity authentication according to the present invention.

As illustrated, FIG. 3 illustrates a flowchart of user identity authentication, for an new input sequence to which identity authentication of a certain user needs to be performed, firstly the related data are preprocessed and normalized through the data preprocessing module, the data are decomposed into the time characteristic vector T and the pressure characteristic vector P according to the methods in step 3, the vectors are respectively input into the neural networks $N_T$ and $N_P$, and output vectors of $N_T$ and $N_P$ are respectively denoted as $O_T$ and $O_P$; a final output vector O is defined as: $O = W_T \cdot O_T + W_P \cdot O_P$;

Compare an Euclidean distance between O and a recognition vector of the user with a preset threshold, if the distance is smaller than a preset threshold, the user is a legal user, a login request is accepted, the sequence is added into a model database and the model database is updated; otherwise, the user is an illegal user, the login request at a current time is refused and a warning is given.

Figure 4:
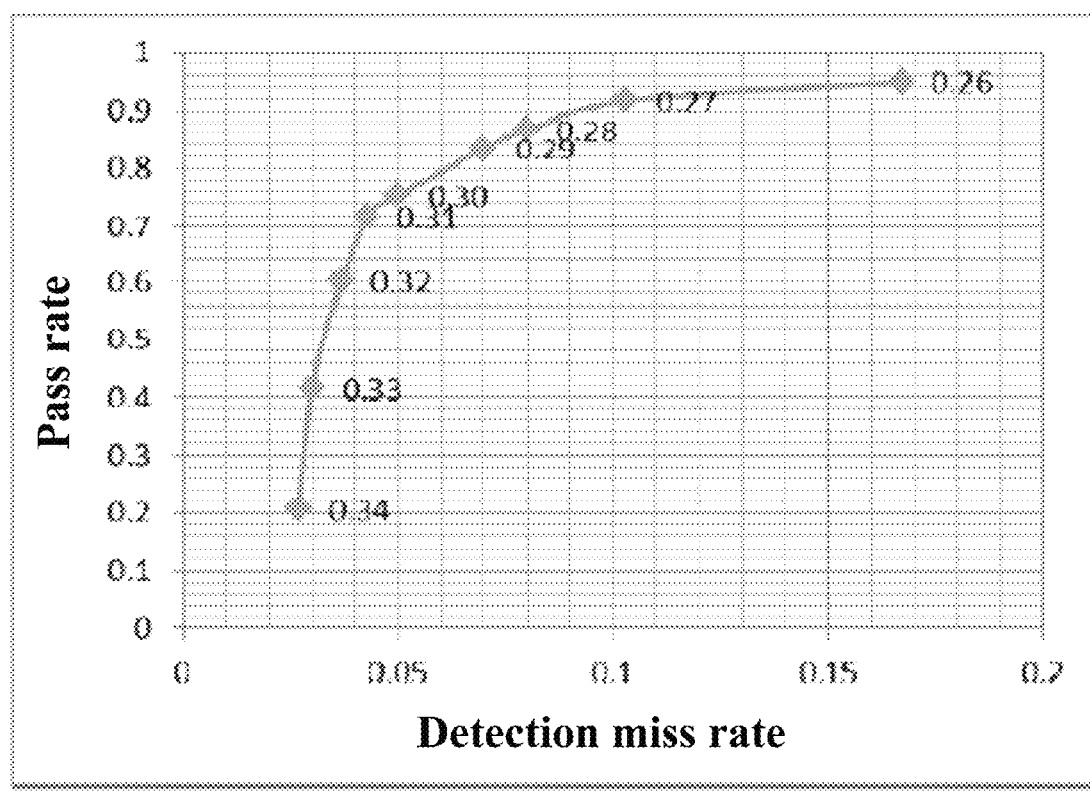
FIG. 4 illustrates an effect curve chart of user identity authentication.

As proved by experiments, when the threshold is 0.27, this method achieves effects that a pass rate of normal user identity authentication is 91.7% and a detection miss rate is 10.3%, FIG. 4 illustrates an effect curve chart of user identity authentication, and this method can guarantee a lower detection miss rate on the premise that a higher user identity authentication pass rate is achieved, and can more effectively authenticate user identities.

The present invention has the following innovations and beneficial effects:

1. The implementation process of the present invention is convenient and feasible, no special hardware support is needed and an improvement is only needed on the basis of traditional authentication; and identity authentication is performed by using information about that mobile terminal users input passwords on mobile phone touch screens and no additional operation is needed for users.

2. Identity (behavior) authentication and password authentication are synchronously performed and the security of the traditional authentication system is improved.

3. The method can guarantee a lower detection miss rate on the premise of a higher user identity authentication pass rate.

4. Models are respectively established for time characteristic data and pressure characteristic data of user inputs such that errors caused by a reason that the sensitivity of sensors of mobile devices is different are reduced.

As described above, by acquiring time characteristic and pressure characteristic data that mobile terminal users click virtual keyboards of touch screens, establishing user unique keyboard behavior models by using RBF neural networks and matching user keyboard behaviors to be authenticated with the models, the present invention achieves the purpose of authenticating user identities and solves the security problem caused by username and password leakage to a certain extent.

The above-mentioned embodiments are just used for exemplarily describing the principle and effects of the present invention instead of limiting the present invention. One skilled in the art may make modifications or changes to the above-mentioned embodiments without departing from the spirit and the scope of the present invention. Therefore, all equivalent modifications or changes made by those who have common knowledge in the art without departing from the spirit and technical concept disclosed by the present invention shall be still covered by the claims of the present invention.

What is claimed is:

1. An identity recognition method based on construction and analysis of touch screen user keypress behavior pattern, characterized in that data analysis is performed by using historical keypress information of inputting passwords by using soft keyboards on mobile phone touch screens according to account login of users within a period of time, corresponding neural network models are established and model calculation is performed to new to-be-detected data to recognize user identities; and the method comprises following steps:

step 1: user data acquisition acquiring corresponding behavior characteristic information according to a keypress behavior process that mobile terminal users input passwords through soft keyboards of mobile phones, wherein the behavior characteristic information comprises time sequence information, pressure information and contact area information that the users click the soft keyboards and input the passwords;

step 2: data preprocessing responsible for processing time data, substracting a downpress timestamp from an upspring timestamp in each input sequence obtain keypress duration $t_h$; substracting upspring time in a previous input sequence from down-press time in each input sequence to obtain keypress interval $t_i$; and denoting pressure data as p and contact area data as a;

processing or removing data which are called and acquired by a system and do not comply with rules; and performing normalization processing to data since the acquired data are different in dimension;

step 3: user behavior training performing classification to users by using RBF (Radial Basis Function) neural networks as models, time information and pressure information of user input behaviors are respectively establishing modeled since sensitivity of mobile phone sensors of users is different, so as to reduce errors caused by difference of mobile devices; denoting T ($t_{h1}, t_{h2}, \ldots, t_{hn}, t_{i1}, t_{i2}, \ldots t_{in-1}$) of one user input as a time characteristic vector, and denoting P ($p_1, p_2, \ldots, p_n, a_1, a_2, \ldots, a_n$) as a pressure characteristic vector, wherein n is user password length; and respectively performing training to T and P by using two independent RBF neural networks, denoted as $N_T$ and $N_P$, wherein an input of the $N_T$ is T and a target output is a unique recognition vector which is allocated to each user in advance; m users which participate in identity judgment are supposed to be $u_1, u_2, \ldots, u_m$, an expected output vector corresponding to each user in a process of training the RBF neural network is $O_{ui} = (X_1,$ $X_2, \ldots, X_m$), which indicates an output of the neural network under an ideal situation, where $$X_j = \begin{cases} 0, & i \neq j \\ x, & i = j \end{cases};$$

and an input of the $N_P$ is P and a target output is the same as $N_T$; the neural network is trained by adopting a self-organized basis function center selection method; after the two neural networks are trained by adopting the method, an average error of each neural network is calculated and the average errors of the two neural networks are respectively denoted as $E_T$ and $E_P$; and an output weight is set for each neural network and the output weights are respectively denoted as $W_T$ and $W_P$, wherein $$W_T = \frac{E_P}{E_T + E_P}, W_P = \frac{E_T}{E_T + E_P};$$

and step 4: user identity authentication for an new input sequence to which identity authentication of a certain user needs to be performed, firstly performing preprocessing and normalization to the new input sequence according to step 2, decomposing the data into the time characteristic vector T and the pressure characteristic vector P according to the methods in step 3, respectively inputting the vectors into the neural networks $N_T$ and $N_P$, and respectively denoting output vectors of $N_T$ and $N_P$ as $O_T$ and $O_P$; defining a final output vector O as:

$$O = W_T \cdot O_T + W_P \cdot O_P$$

comparing an Euclidean distance between O and a recognition vector of the user with a preset threshold, if the distance is smaller than a preset threshold, the user is a legal user, accepting a login request, adding the sequence into a model database and updating the model database; and otherwise, the user is an illegal user, refusing the login request at a current time and giving a warning.

2. The identity recognition method based on construction and analysis of touch screen user keypress behavior pattern according to claim 1, characterized in that, at a user data acquisition stage, key-in data in one recent month are recorded and acquired as training data of users, and relevant data acquisition information is sent at a backstage to a remote server.

3. The identity recognition method based on construction and analysis of touch screen user keypress behavior pattern according to claim 1, characterized in that, for each user, the password length is fixed, a number of data items of each recorded data entry is given and data entries with data items which are not matched with given length are removed; and data with keypress duration $t_h$ and keypress interval $t_i$ greater than 3000 ms, pressure P greater than 1.5 and contact area a greater than 1 are considered as wrong data caused by sensor errors, and the data are removed.

4. The identity recognition method based on construction and analysis of touch screen user keypress behavior pattern according to claim 1, characterized in that, in step 2, normalization processing is respectively performed to all recorded $t_h$, $t_i$, p and a; and raw data X is transformed to X* through maximum and minimum normalization according to a transformation formula $$X^* = \frac{X - \min}{X - \max},$$

wherein max is a maximum value of samples in all users and min is a minimum value of samples in all users.

* * * * *